June 15, 1926.
C. L. CHATHAM
CIRCUIT TESTING DEVICE
Filed April 12, 1923
1,588,572
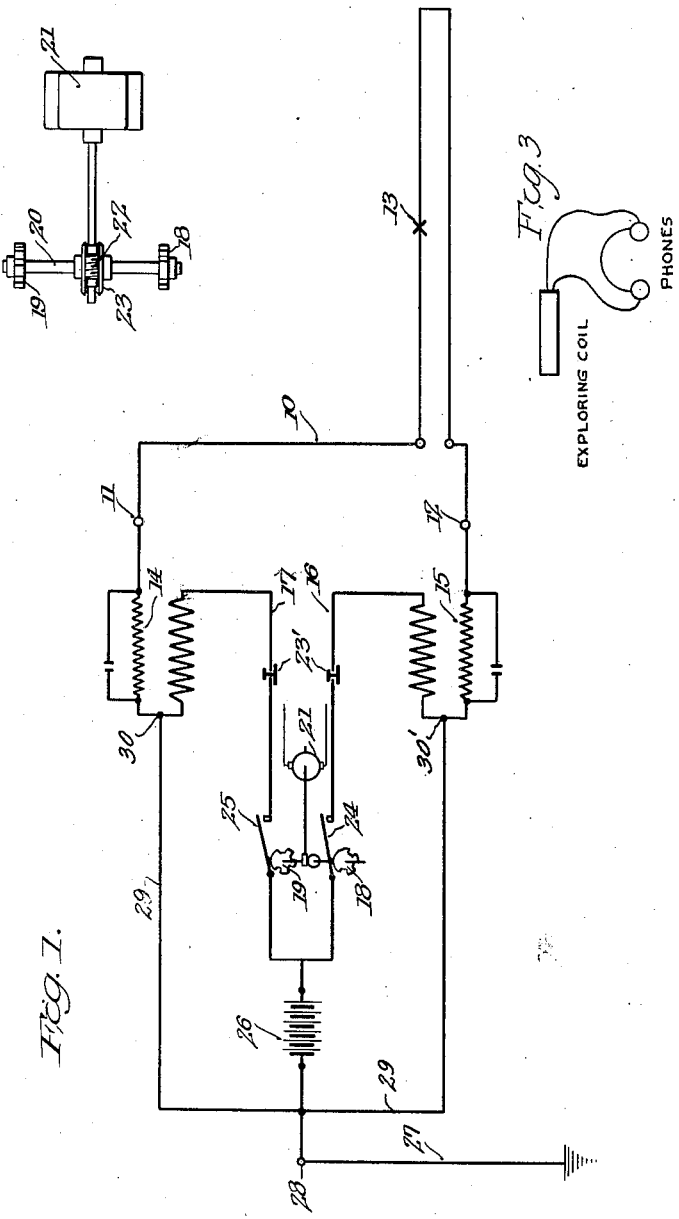
Inventor
Clyde L. Chatham.
By William F. Chakouy
Attorneys Patented June 15, 1926.

1,588,572

UNITED STATES PATENT OFFICE.

CLYDE L. CHATHAM, OF PATERSON, NEW JERSEY.

CIRCUIT-TESTING DEVICE.

Application filed April 12, 1923. Serial No. 631,612.

This invention relates to an improved method and apparatus for locating faults in electric circuits, such as grounds, leaks, crosses, etc., and has for its object means for locating the fault quickly and precisely.

The invention relates to the general type of device and method which consists in sending over the line a signal and the connection with the circuit of suitable detecting apparatus which, when used at different points, will indicate by the varying intensity of the signal the location of the fault. For detecting the signal on the line any suitable means may be used, such as an exploring coil and exploring rod which makes direct contact with the line in conjunction with a telephone receiver. Such devices are well known in the art and need no detailed description.

It is well known in the art to locate faults by means of a signal sent over the circuit in conjunction with detecting apparatus, but it has been found that in employing this method it is not always possible to locate the signal quickly and accurately for the reason that when only one signal is employed the operator depends upon the diminution of the audibility of the signal as the exploring or detecting device is moved past the fault, and very often there is produced a "carrying over" effect by which the signal is carried beyond the fault at a diminished intensity, and this diminution is difficult for the observer to note. The operator must have had considerable experience in the work, otherwise he is likely to pass the fault without noting the change in the intensity of the signal.

The present invention seeks to obviate this weakness in the present apparatus and methods by providing two substantially simultaneous signals which may be compared by the observer, thereby reducing the likelihood of his passing the fault without noting the same. It has been found that intensity of sound may be more readily determined if the two signals, the intensities of which are to be compared, exist simultaneously or substantially at the same time. In carrying out my improved method two signals of distinguishable character are sent simultaneously on a line so that they approach the fault from opposite directions. The signals are preferably sent at the same time, or, if alternately, so that they slightly overlap, in order to enable the observer to readily compare them. The observer, in using a detecting apparatus, will readily be able to distinguish the two signals, which, at the fault, are heard with equal intensity, but on either side of the fault one of the signals coming from the terminal of the circuit at the same side of the fault will be heard with considerably a greater intensity.

Referring to the accompanying drawings:—

Fig. 1 is a diagrammatic illustration of the method and apparatus adapted to carry out the same, Fig. 2 is a detailed view showing suitable mechanism for directing the signal drums, and Fig. 3 is a diagrammatic view showing an exploring coil and phones.

In the drawings, 10 indicates a circuit having terminals 11, 12 in which, for purposes of illustration, there is indicated a fault 13. The circuit or wire under test may be of any type; either one in which the opposite ends are at different switchboards, or terminals, or, as illustrated, of the series type with both terminals at one switchboard. In employing the method nothing is known of the location of the fault other than that it lies between the terminals 11 and 12. From the terminal 11 a signal distinct as to duration or tone is forced over the line, and simultaneously, from 12 another signal is forced over the line. The observer endeavoring to locate the fault may use any suitable detecting apparatus, such as is well known in the art. For an example of such a device, reference may be had to the patent to Rood, 504,751, granted Sept. 12, 1893. Any device such as is shown in Fig. 3 comprising an inductor coil and a telephone receiver may be employed, and the observer will note with such a device the different intensities of the signals. In applying the detecting apparatus to the line between the terminal 11 and the fault the signal proceeding from the terminal 11 will be found to predominate over the signal proceeding from the opposite terminal in strength; but between the fault 13 and the terminal 12 the other signal will predominate, whereas, directly at the fault the signals will be of the same intensity. By sending both signals, which are distinctive, at the same time, or so that they slightly overlap, the observer will hear the two simultaneously and thereby may readily compare them. In devices heretofore employed, where only one signal is used, due to the carrying over of the signal past the fault the observer may fail to detect the diminished intensity of the signal, the difference being somewhat slight. In employing the present method, the signals occurring simultaneously or in slightly overlapping relation, the comparison is simple if the "carrying over" effect is produced.

Any suitable apparatus may be employed for carrying out the method. Referring to Fig. 1 there is shown an apparatus comprising coils 14, 15 which are connected to the terminals 11, 12, and which, by means of leads 16, 17, are associated with signal drums 18, 19 provided upon a shaft 20 which is driven from a motor 21 through worm gear 22 meshing with a gear 23 upon the shaft. The motor may be driven from any convenient source of power and switches 23' are located in the lines 16, 17, and when opened disconnect the drums from the circuit. The signal drums serve to interrupt the circuit through hinged contact blades 24, the ends 25 of which are intermittently raised and lowered by means of the signal drums. The apparatus may receive current from any suitable source, such as a battery 26. The circuit is grounded by means of a lead 27 connected to a binding post 28 upon the apparatus. The ground side of the battery may be connected by means of leads 29 with the common terminals 30 of the coils 14 and 15. In other words, these coils are ignition coils with three terminals, one of which is common to both high and low voltage windings, and it is to this terminal that the leads 29 are connected.

It will be understood, of course, that the method and apparatus are not limited to a circuit where both terminals are available at the same place, since, in many instances both terminals could not be served by one instrument. In such instances the operator at one station connects an apparatus to the line and transmits a signal over the same, and at the same time the operator at the other end of the line transmits a second distinctive signal. The observer may then travel along the line, and by applying his detector thereto, will be able to note the signals and thereby locate the fault.

The method of dual signaling may be employed whether the wire be overhead or underground, whether an outside power or lighting distribution circuit, telephone or telegraph circuit, cable or open wire.

It should be understood that the method is not limited to the specific apparatus indicated, but that any apparatus may be used which is adapted to transmit the distinctive signals desired, and such changes may be made in the method as come within the scope of the following claims. It will be understood that at each side of the fault 13 the signal emanating from the signal device on that particular side will be more pronounced, and directly at the fault the two signals will be heard with substantially equal intensity. Because of this, the location of the fault may be readily determined.

I claim:

1. The method of testing an electric circuit which consists in sending in opposite directions on the circuit on opposite sides of a fault distinguishable signals and tapping said circuit at different points with a detecting apparatus adapted to indicate the comparative intensities and characters of the signals.

2. The method of testing an electric circuit which consists in sending alternately in opposite directions on the circuit distinguishable signals and tapping said circuit at different points with a detecting apparatus adapted to indicate the comparative intensities of the signals.

3. The method of testing an electric circuit which consists in sending in opposite directions on the circuit on opposite sides of a fault distinguishable overlapping signals and tapping said circuit at different points with a detecting apparatus adapted to indicate the comparative intensities and characters of the signals.

4. The method of testing an electric circuit which consists in sending alternately in opposite directions on the circuit distinguishable overlapping signals and tapping said circuit at different points with a detecting apparatus adapted to indicate the comparative intensities of the signals.

In testimony whereof I have hereunto set my hand.

CLYDE L. CHATHAM.